US012764638B2

(12) United States Patent
Hashmi et al.

(10) Patent No.: US 12,764,638 B2
(45) Date of Patent: Oct. 13, 2026

(54) METHOD AND APPARATUS FOR HANDLING FORBIDDEN TRACKING AREA IDENTITY BELONGS TO DIFFERENT PUBLIC LAND MOBILE NETWORK-IDENTIFIER IN COMMUNICATION SYSTEM

(71) Applicant: SAMSUNG ELECTRONICS CO., LTD., Suwon-si (KR)

(72) Inventors: Danish Ehsan Hashmi, Bangalore (IN); Jagadeesh Gandikota, Bangalore (IN); Koustav Roy, Bangalore (IN); Lalith Kumar, Bangalore (IN); Utsav Sinha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 18/578,284

(22) PCT Filed: Nov. 1, 2023

(86) PCT No.: PCT/KR2023/017314
§ 371 (c)(1),
(2) Date: Jan. 10, 2024

(87) PCT Pub. No.: WO2024/096598
PCT Pub. Date: May 10, 2024

(65) Prior Publication Data

US 2024/0381226 A1 Nov. 14, 2024

(30) Foreign Application Priority Data

Nov. 2, 2022 (IN) ............................. 202241062662
Sep. 25, 2023 (IN) ............................. 202241062662

(51) Int. Cl.
*H04W 48/08* (2009.01)
*H04W 60/06* (2009.01)
*H04W 84/04* (2009.01)

(52) U.S. Cl.
CPC ........... *H04W 48/08* (2013.01); *H04W 60/06* (2013.01); *H04W 84/042* (2013.01)

(58) Field of Classification Search
CPC ..... H04W 48/02; H04W 48/04; H04W 48/08; H04W 60/04; H04W 60/06; H04W 8/02; H04W 84/042
See application file for complete search history.

(56) References Cited

U.S. PATENT DOCUMENTS 10,057,818 B2 8/2018 Kiss
12,294,932 B2 * 5/2025 Won ...................... H04W 48/02
(Continued)

FOREIGN PATENT DOCUMENTS

WO 2019137474 A1 7/2019

OTHER PUBLICATIONS

International Search Report and Written Opinion of the International Searching Authority dated Feb. 1, 2024, in connection with International Application No. PCT/KR2023/017314, 7 pages.
(Continued)

*Primary Examiner* — Kashif Siddiqui

(57) ABSTRACT

The disclosure relates to a 5G or 6G communication system for supporting a higher data transmission rate.

10 Claims, 5 Drawing Sheets

(56) References Cited

U.S. PATENT DOCUMENTS

| | | | | |
|---|---|---|---|---|
| 2014/0295837 | A1* | 10/2014 | Madasamy | H04W 48/04 455/435.1 |
| 2015/0245256 | A1* | 8/2015 | Kiss | H04W 60/04 455/436 |
| 2019/0223246 | A1* | 7/2019 | Huang-Fu | H04W 76/18 |
| 2023/0370957 | A1* | 11/2023 | Niemi | H04W 48/14 |
| 2024/0147349 | A1* | 5/2024 | Chiba | H04W 8/02 |
| 2025/0030776 | A1* | 1/2025 | Lu | H04L 67/51 |

OTHER PUBLICATIONS

Huawei et al. "AMF sends forbidden TAI(s) to UE", S2-2206263, 3GPP TSG SA WG2 Meeting #152-e, Aug. 2022, 35 pages.
OPPO, "5GMM procedures for satellite access for reject cause on UE location—alternative handling", C1-213100, 3GPP TSG CT WG1 Meeting #129-e, Apr. 2021, 61 pages.
Huawei et al., "AMF sends forbidden TAI(s) to UE", S2-2207031, 3GPP TSG SA WG2 Meeting #152-e, Aug. 2022, 3 pages.
CT4, "Reply LS on Nudm_UEContextManagement service for satellite NG-RAN", S2-2208135, 3GPP TSG SA WG2 Meeting #153-e, Aug. 2022, 3 pages.
3GPP TS 36.304 V17.3.0 (Dec. 2022), Technical Specification, 3rd Generation Partnership Project; Technical Specification Group Radio Access Network; Evolved Universal Terrestrial Radio Access (E-UTRA); User Equipment (UE) procedures in idle mode (Release 17), Dec. 2022, 66 pages.
3GPP TS 24.501 V18.0.1 (Sep. 2022), Technical Specification, 3rd Generation Partnership Project; Technical Specification Group Core Network and Terminals; Non-Access-Stratum (NAS) protocol for 5G System (5GS); Stage 3; (Release 18), Sep. 2022, 1007 pages.
Office Action issued Dec. 17, 2025, in connection with Korean Patent Application No. 10-2023-7042833, 11 pages.
3GPP TS 23.122 V18.0.0 (Sep. 2022) Technical Specification; 3rd Generation Partnership Project; Technical Specification Group Core Network and Terminals; Non-Access-Stratum (NAS) functions related to Mobile Station (MS) in idle mode (Release 18); 134 pages.

* cited by examiner

[Fig. 1a]
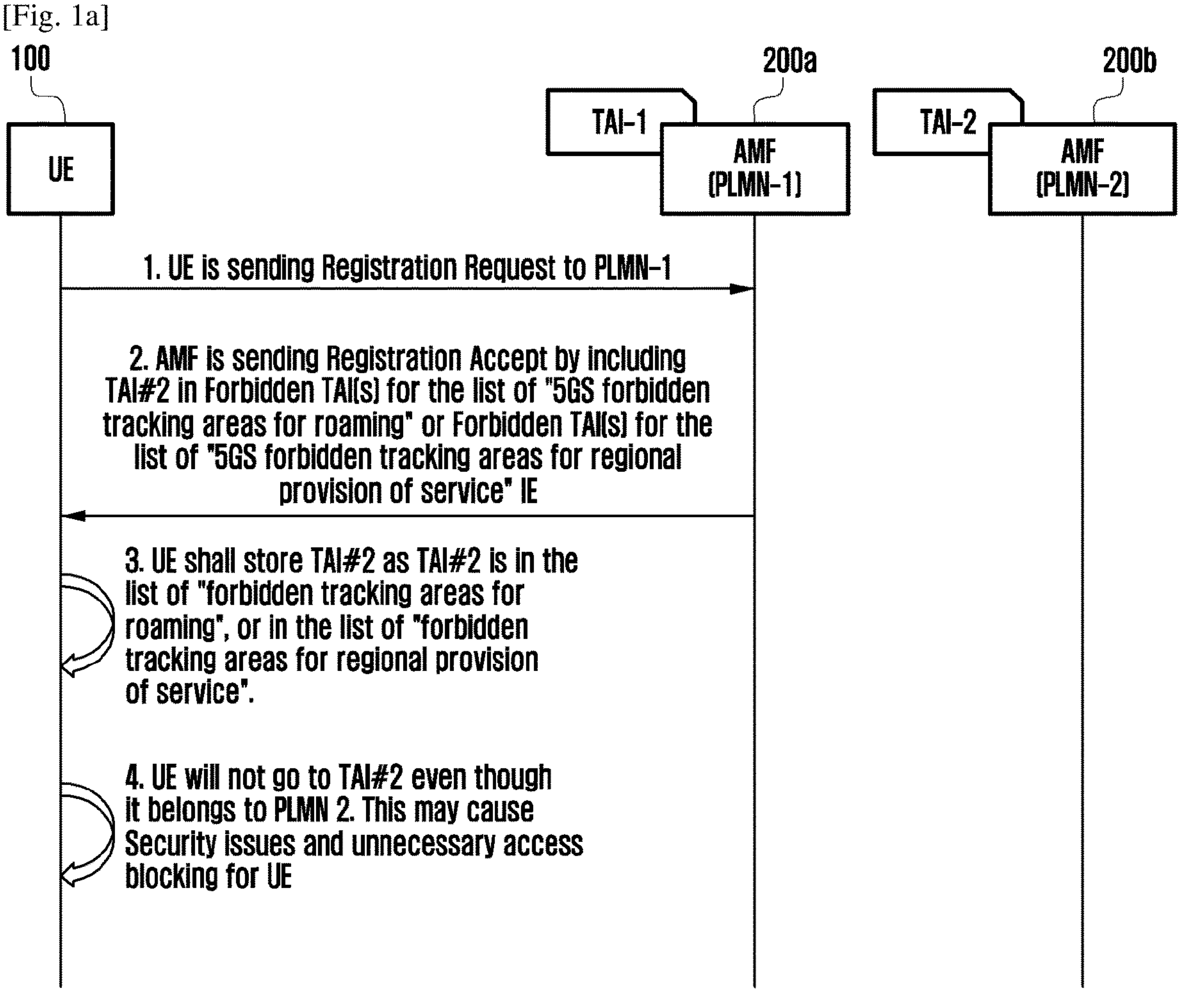

[Fig. 1b]
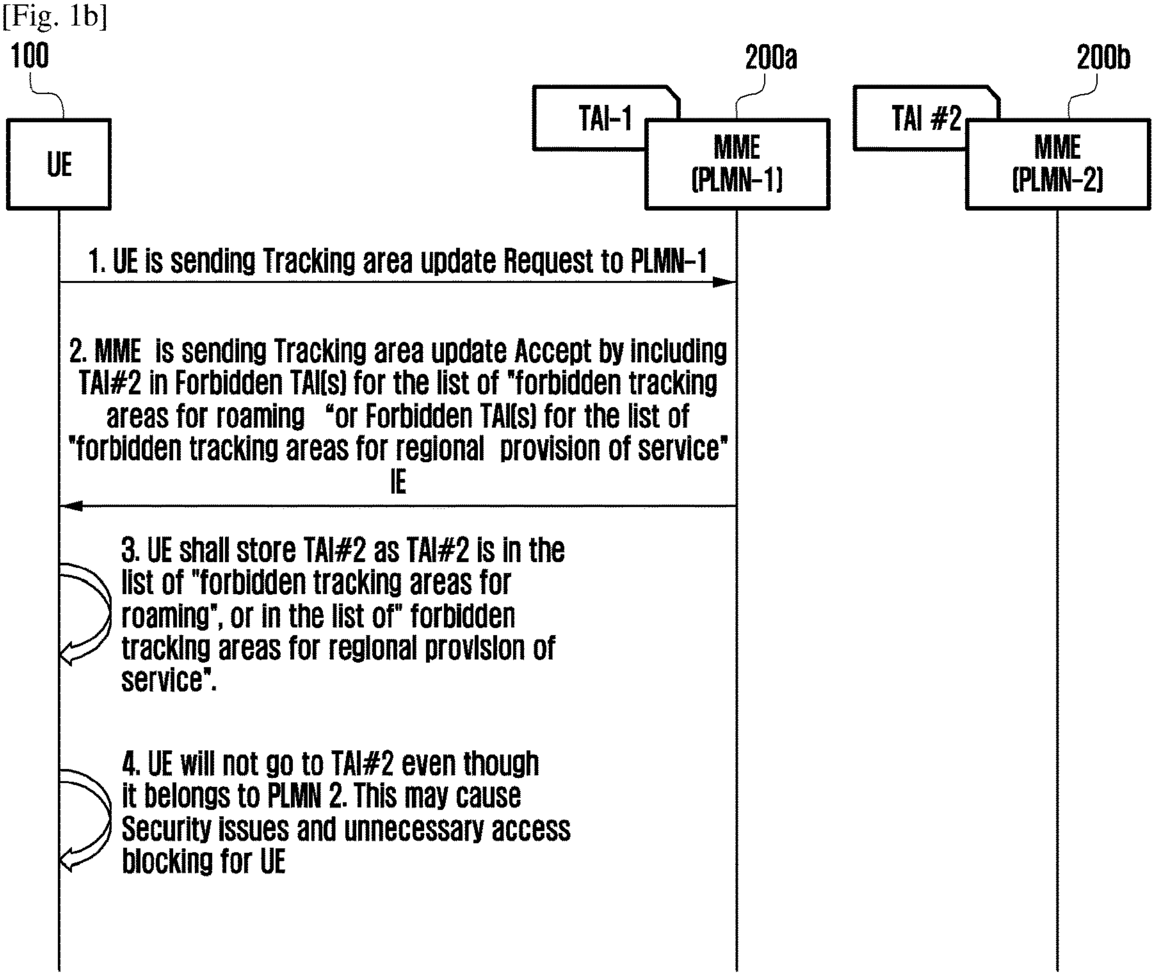
[Fig. 2]
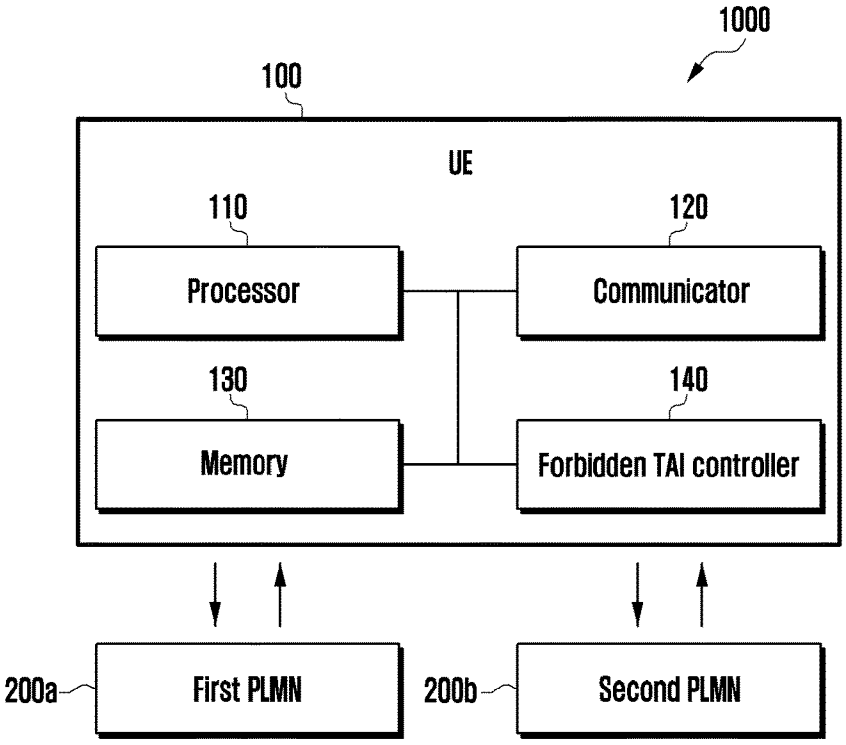

[Fig. 3a]
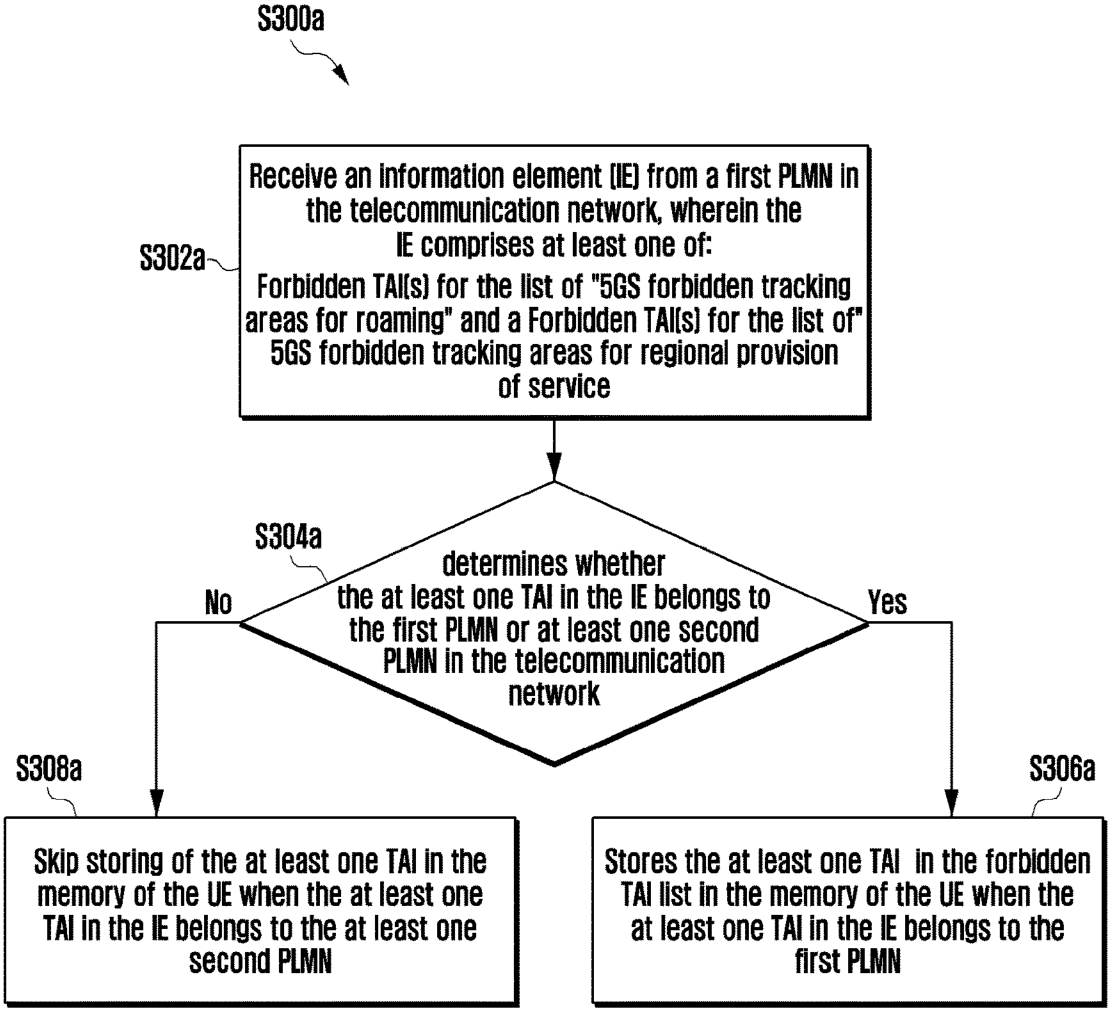
[Fig. 3b]
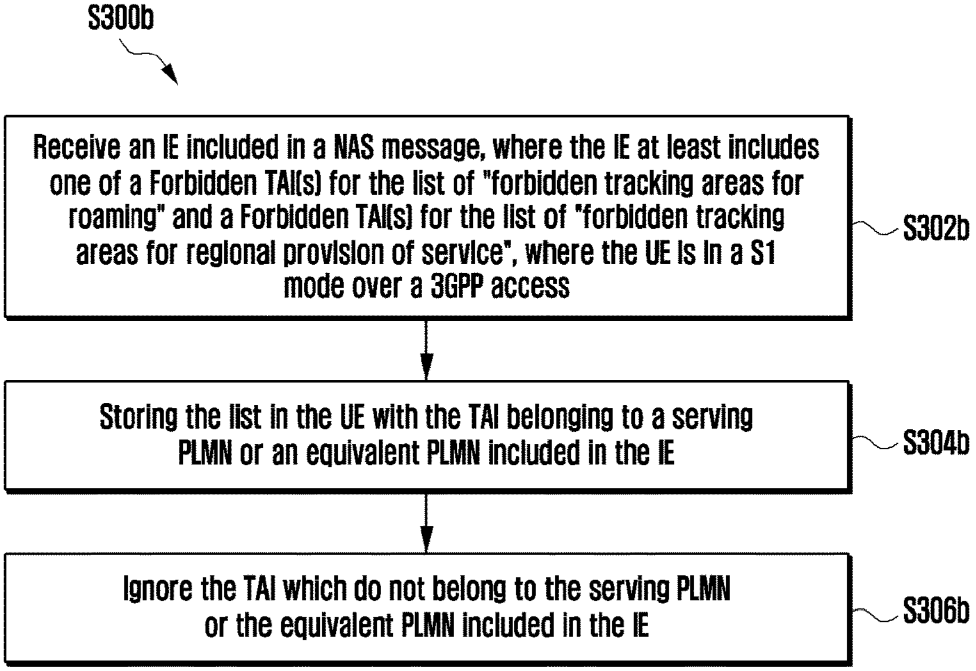

[Fig. 4]
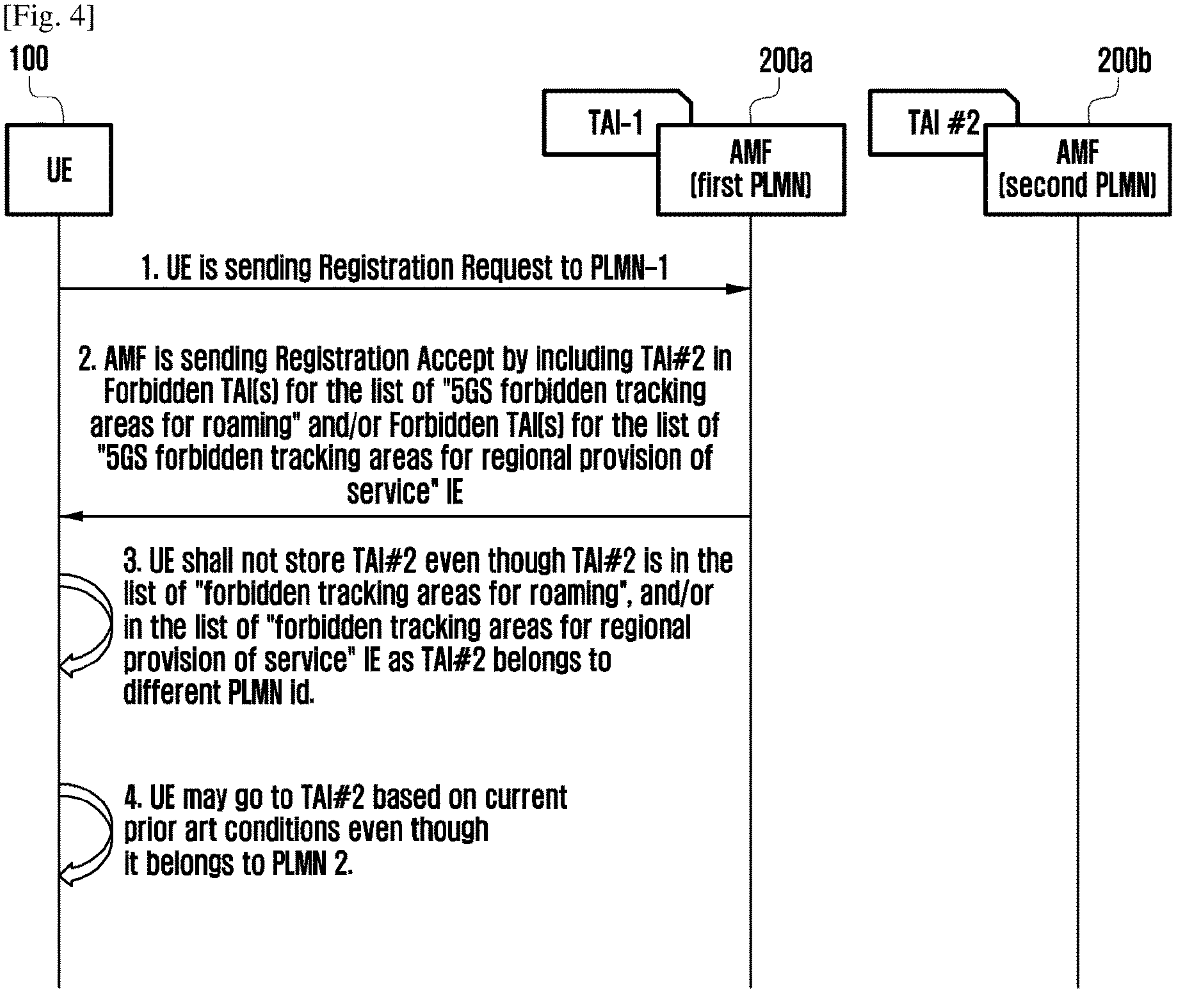
[Fig. 5]
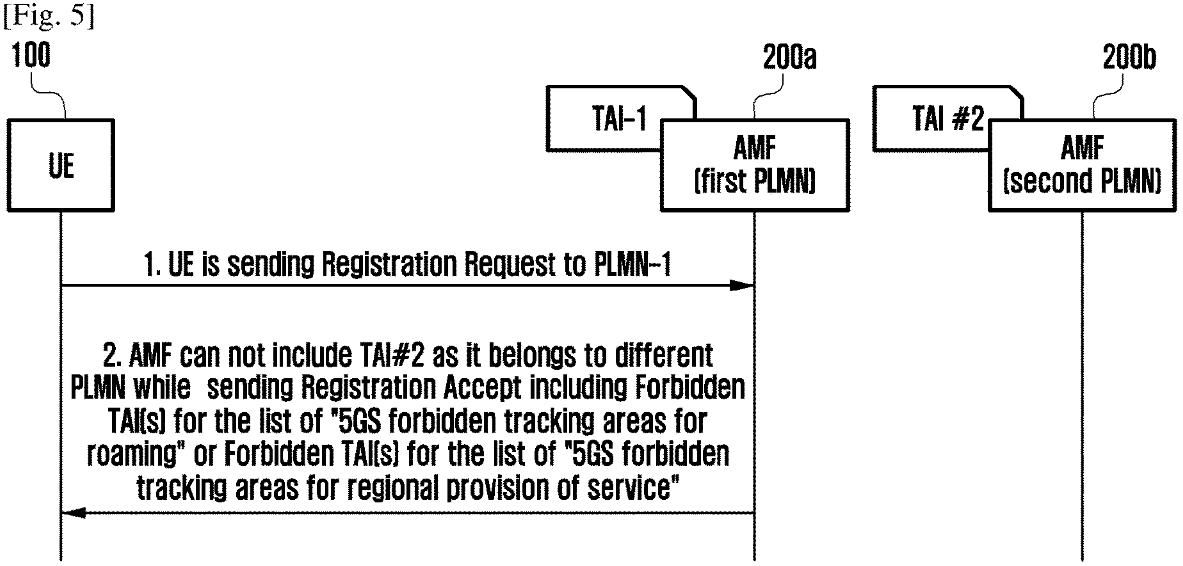

[Fig. 6]
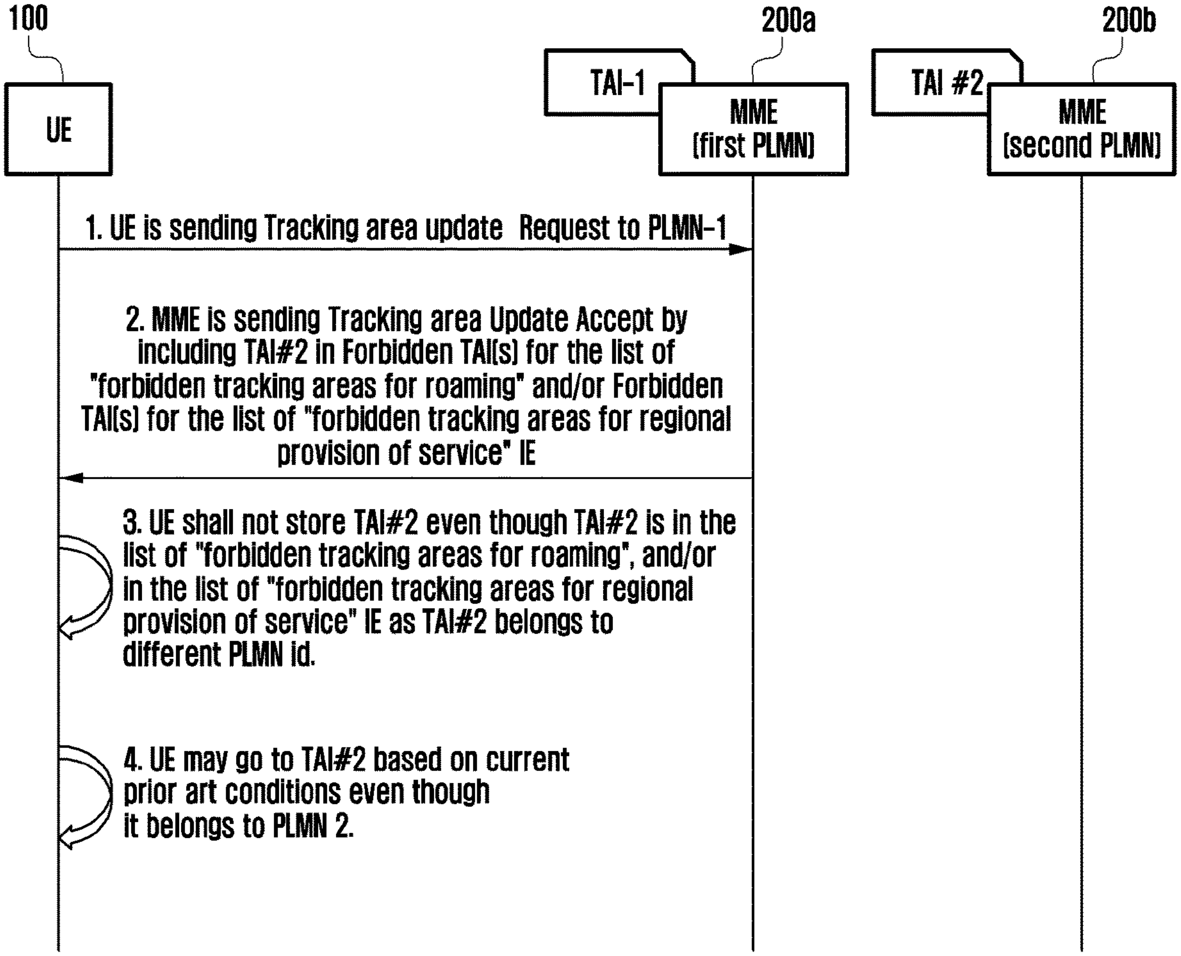
[Fig. 7]
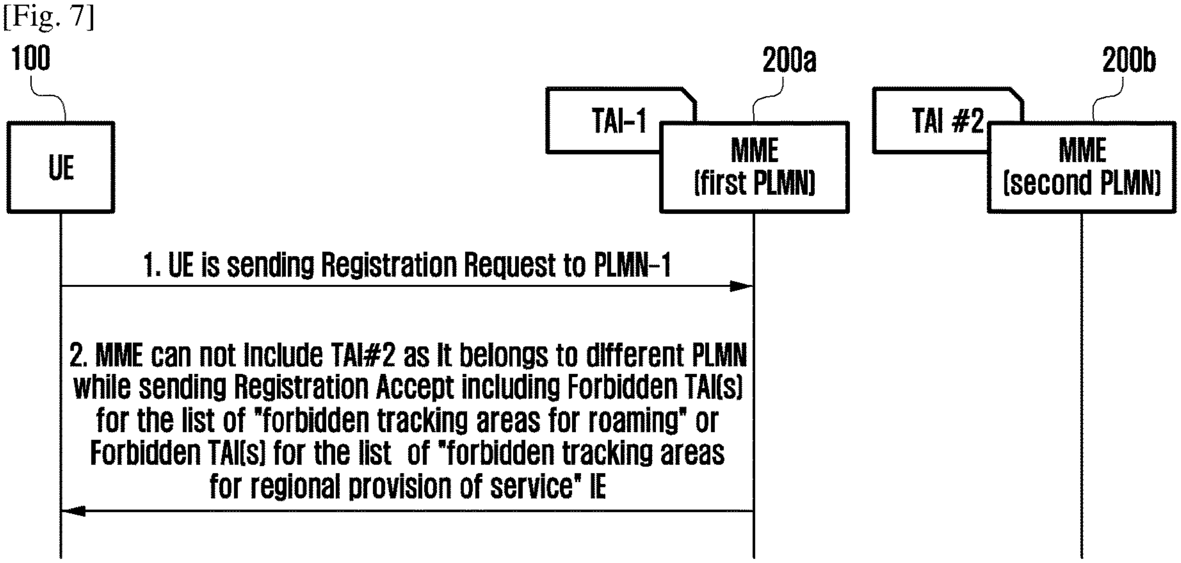

METHOD AND APPARATUS FOR HANDLING FORBIDDEN TRACKING AREA IDENTITY BELONGS TO DIFFERENT PUBLIC LAND MOBILE NETWORK-IDENTIFIER IN COMMUNICATION SYSTEM

TECHNICAL FIELD

The embodiments disclosed herein generally relate to the field of a telecommunication network, and more particularly, to a User Equipment (UE) and a method for handling forbidden Tracking Area Identity (TAI) linked to different Public Land Mobile Network-Identifier (PLMN-ID) in the telecommunication network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

DISCLOSURE OF INVENTION

Technical Problem

The principal objective of the embodiment herein disclose a method and a UE for handling forbidden Tracking Area Identity (TAI) belongs to different Public Land Mobile Network-Identifier (PLMN-ID) in a telecommunication network.

In line with development of the communication systems, there is a need for method and apparatus for handling forbidden TAI.

Another objective of the embodiment herein disclose that the UE identifies TAIs which belong to a serving PLMN or an equivalent PLMN(s) in the received Forbidden TAI(s) for the list of "5GS forbidden tracking areas for roaming" or the Forbidden TAI(s) for the list of "5GS forbidden tracking areas for regional provision of service" IE(s) in a registration accept or any other downlink 5G Non-Access Stratum (NAS) message over 5GS (or NI mode) and stores them into respective list of the "5GS forbidden tracking areas for roaming" or "5GS forbidden tracking areas for regional provision of service" in the UE.

Another objective of the embodiment herein disclose that the UE identifies TAIs which belong to a serving PLMN or an equivalent PLMN(s) in the received Forbidden TAI(s) for the list of "forbidden tracking areas for roaming" or the Forbidden TAI(s) for the list of "forbidden tracking areas for regional provision of service" IE(s) in a Tracking Area Update Accept or any other downlink Non-Access Stratum (NAS) message over E-UTRAN (or SI mode) and stores them into respective list of a "forbidden tracking areas for roaming" or "forbidden tracking areas for regional provision of service" in the UE.

Another objective of the embodiment herein disclose that the UE ignores TAI(s) which do not belong to the serving PLMN or the equivalent PLMN(s) included in Forbidden TAI(s) for the list of "5GS forbidden tracking areas for roaming" and/or Forbidden TAI(s) for the list of "5GS forbidden tracking areas for regional provision of service" IE(s) in the registration accept or any other 5GS NAS message over NI mode before storing the TA(s) included in the IE(s) to respective list of "5GS forbidden tracking areas for roaming" or the "5GS forbidden tracking areas for regional provision of service" in the UE.

Another objective of the embodiment herein disclose that the UE ignores TAI(s) which do not belong to the serving PLMN or the equivalent PLMN(s) included in Forbidden TAI(s) for the list of "forbidden tracking areas for roaming" and/or "forbidden tracking areas for regional provision of service" IE(s) in the Tracking Area Update Accept or any other NAS message over SI mode before storing these TA(s) included in the IE(s) to the respective list of the "forbidden tracking areas for roaming" or the "forbidden tracking areas for regional provision of service" IE in the UE.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

Embodiments disclosed herein provide a method for handling forbidden TAI belongs to different PLMN-ID in a telecommunication network. The method includes receiving, by a UE in the telecommunication network, an IE from a first PLMN in the telecommunication network over 5GS (In N1 mode). The downlink 5GS NAS message includes at least one Forbidden TAI(s) for the list of "5GS forbidden tracking areas for roaming" and Forbidden TAI(s) for the list of "5GS forbidden tracking areas for regional provision of service" IE in the telecommunication network. Further, the method includes determining, by the UE, whether the at least one TAI in the Forbidden TAI(s) for the list of "5GS forbidden tracking areas for roaming" IE belongs to the first PLMN or at least one second PLMN in the telecommunication network. Further, the method includes determining, by the UE, whether the at least one TAI in the Forbidden TAI(s) for the list of "5GS forbidden tracking areas for regional provision of service" IE belongs to the first PLMN or at least one second PLMN in the telecommunication network In an embodiment, the method includes storing the at least one TAI from Forbidden TAI(s) for the list of "5GS forbidden tracking areas for roaming" IE to the list of "5GS forbidden tracking areas for roaming" in a memory of the UE when the at least one TAI included in the IE belongs to the first PLMN. In an embodiment, the method includes storing the at least one TAI from Forbidden TAI(s) for the list of "5GS forbidden tracking areas for regional provision of service" IE to the list of "5GS forbidden tracking areas for regional provision of service" or in a memory of the UE when the at least one TAI included in the IE belongs to the first PLMN In another embodiment, the method includes skipping storing (or ignoring) of the at least one TAI in the memory of the UE when the at least one TAI in the Forbidden TAI(s) for the in the list of "5GS forbidden tracking areas for roaming" or Forbidden TAI(s) for the list of "5GS forbidden tracking areas for regional provision of service" IE belongs to the at least one second PLMN.

In an embodiment, receiving, by the UE, the IE from the first PLMN in the downink NAS message includes one of a REGISTRATION REJECT message, a SERVICE REJECT message, a DEREGISTRATION REQUEST message, a REGISTRATION ACCEPT message, and a SERVICE ACCEPT message. The. The first PLMN is serving PLMN.

Embodiments disclosed herein provide a UE for handling forbidden TAI belongs to different PLMN-ID in a telecommunication network. The UE includes a forbidden TAI controller communicatively coupled to a memory and a processor. The forbidden TAI controller receives an IE from a first PLMN in the telecommunication network. The Downlink 5GS NAS message includes at least one forbidden TAI(s) for the list of "5GS forbidden tracking areas roaming" and forbidden TAI(s) for the list of "5GS forbidden tracking areas for regional provision of service" in the telecommunication network. Further, the forbidden TAI controller determines whether the at least one TAI in the TAI(s) for the list of "5GS forbidden tracking areas roaming" belongs to the first PLMN or at least one second PLMN in the telecommunication network. Further, the method includes determining, by the UE, whether the at least one TAI in the Forbidden TAI(s) for the list of "5GS forbidden tracking areas for regional provision of service" IE belongs to the first PLMN or at least one second PLMN in the telecommunication network In an embodiment, the forbidden TAI controller stores the at least one TAI from Forbidden TAI(s) for the list of "5GS forbidden tracking areas for roaming" IE to the list of "5GS forbidden tracking areas for roaming" in the memory of the UE when the at least one TAI included in the IE belongs to the first PLMN. In an embodiment, the method includes storing the at least one TAI from Forbidden TAI(s) for the list of "forbidden tracking areas for regional provision of service" IE to the list of "forbidden tracking areas for regional provision of service" in a memory of the UE when the at least one TAI included in the IE belongs to the first PLMN In another embodiment, the forbidden TAI controller ignores (or skips stores) of the at least one TAI in the memory of the UE when the at least one TAI in the Forbidden TAI(s) for the list of "5GS forbidden tracking areas for roaming" or Forbidden TAI(s) for the list of "5GS forbidden tracking areas for regional provision of service" IE belongs to the at least one second PLMN.

Embodiments disclosed herein provide a method for handling forbidden TAI belongs to different PLMN-ID in a telecommunication network. The method includes receiving, by a UE in the telecommunication network, an IE included in a NAS message. The IE includes one of a Forbidden TAI(s) for the list of "forbidden tracking areas for roaming" and a Forbidden TAI(s) for the list of "forbidden tracking areas for regional provision of service", wherein the UE is in a S1 mode over a 3GPP access. In an embodiment, the method includes storing the at least one TAI from Forbidden TAI(s) for the list of "forbidden tracking areas for roaming" IE to the list of "forbidden tracking areas for roaming" in a memory of the UE when the at least one TAI included in the IE belongs to the first PLMN. In an embodiment, the method includes storing the at least one TAI from Forbidden TAI(s) for the list of "forbidden tracking areas for regional provision of service" IE to the list of "forbidden tracking areas for regional provision of service" or in a memory of the UE when the at least one TAI included in the IE belongs to the first PLMN In another embodiment, the method includes skipping storing of the at least one TAI in the memory of the UE when the at least one TAI in the Forbidden TAI(s) for the in the list of "forbidden tracking areas for roaming" or Forbidden TAI(s) for the list of "forbidden tracking areas for regional provision of service" IE belongs to the at least one second PLMN.

In an embodiment, the NAS message includes one of: ATTACH REJECT message, an ATTACH ACCEPT message, a DETACH REQUEST message, a TRACKING AREA UPDATE REJECT message, a TRACKING AREA UPDATE ACCEPT message, a SERVICE ACCEPT message, and a SERVICE REJECT message.

Embodiments disclosed herein provide a UE for handling forbidden TAI belongs to different PLMN-ID in a telecommunication network. The UE includes a forbidden TAI controller communicatively coupled to a memory and the processor. The forbidden TAI controller receives the IE included in the NAS message. The IE comprises at least one of a Forbidden TAI(s) for the list of "forbidden tracking areas for roaming" and a Forbidden TAI(s) for the list of "forbidden tracking areas for regional provision of service", wherein the UE is in a S1 mode over a 3GPP access. Further, the forbidden TAI controller updates a list with the at least one TAI belonging to the serving PLMN or the equivalent PLMN included in the IE. Further, the forbidden TAI controller ignores the TAI which do not belong to the serving PLMN or the equivalent PLMN included in the IE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Advantageous Effects of Invention

The present disclosure provides an effective and efficient method for handling forbidden TAI. Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

The telecommunication network and the method are illustrated in the accompanying drawings, throughout which like reference letters indicate corresponding parts in the various figures. The embodiments herein will be better understood from the following description with reference to the drawings, in which:

FIG. 1A is a sequence diagram illustrating a method for providing list of forbidden TAIs linked to different PLMN IDs.

FIG. 1B is a sequence diagram illustrating a method for providing list of forbidden TAIs linked to different PLMN ID.

FIG. 2 shows various hardware components of a telecommunication network for handling forbidden TAI belongs to different PLMN-IDs, according to the embodiments as disclosed herein;

FIG. 3A is a flow chart illustrating a method for handling forbidden TAI belongs to the different PLMN-IDs in the telecommunication network, according to the embodiments as disclosed herein;

FIG. 3B is another flow chart illustrating a method for handling forbidden TAI belongs to the different PLMN-IDs in the telecommunication network, according to the embodiments as disclosed herein;

FIG. 4 is a sequence diagram illustrating a method, by a UE, for not adding TAIs in the forbidden TAIs linked to the different PLMN IDs, according to the embodiments as disclosed herein;

FIG. 5 is a sequence diagram illustrating a method, by the UE, for not adding TAIs in the forbidden TAIs linked to the different PLMN IDs, according to the embodiments as disclosed herein;

FIG. 6 is another sequence diagram illustrating a method, by the UE, for not adding TAIs in the forbidden TAIs linked to the different PLMN IDs, according to the embodiments as disclosed herein; and FIG. 7 is a sequence diagram illustrating a method, by the UE, for not adding TAIs in the forbidden TAIs linked to the different PLMN ID, according to the embodiments as disclosed herein.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the invention. Furthermore, the one or more elements may have been represented in the drawing by conventional symbols, and the drawings may show only those specific details that are pertinent to the understanding the embodiments of the invention so as not to obscure the drawing with details that will be readily apparent to those of ordinary skill in the art having benefit of the description herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one clement from another.

In general, in a S1 mode, a UE stores a list of "forbidden tracking areas for roaming", as well as a list of "forbidden tracking areas for regional provision of service". In a N1 mode, the UE stores the forbidden UE stores a list of "Fifth Generation (5GS) forbidden tracking areas for roaming", as well as a list of "5GS forbidden tracking areas for regional provision of service" The lists shall be erased when the UE is switched OFF or when a Universal Integrated Circuit Card (UICC) containing a Universal Subscriber Identity Module (USIM) is removed, and periodically (with a period in the range 12 to 24 hours). When the lists are erased, the UE performs a cell selection according to Third Generation Partnership Project (3GPP) technical specification (TS) 36.304 or TS 38.304. One or more tracking areas are removed from the list of "forbidden tracking areas for roaming" in the UE, as well as the list of "forbidden tracking areas for regional provision of service" if, after a subsequent procedure e.g. attach procedure, tracking area updating procedure and Globally Unique Temporary Identifier (GUTI) reallocation procedure, one or more tracking areas in the lists is received from the telecommunication network (or wireless network). If the UE provides only one Packet Data network (PDN) connection established for emergency bearer services, the tracking areas shall not be removed from the lists if one or more tracking areas in the lists are received from the network. In the S1 mode, the UE shall update a suitable list whenever an ATTACH REJECT message, a TRACKING AREA UPDATE REJECT message, a SERVICE REJECT message or a DETACH REQUEST message is received with an EPS mobility management (EMM) cause for example #12 "tracking area not allowed", #13 "roaming not allowed in the tracking area", or #15 "no suitable cells in the tracking area" or an ATTACH ACCEPT or a TRACKING AREA UPDATE ACCEPT message is received with the forbidden TAI(s). Each list shall accommodate 40 or more TAIs. When the list is full and a new entry is to be inserted, the oldest entry shall be deleted. In a downlink non access stratum (NAS) message, an Information Element (IE) can be included to indicate the forbidden TAI(s) to be stored in the list of "forbidden tracking areas for roaming". The IE is included only if the message is sent via satellite Evolved Universal Terrestrial Access Network (E-UTRAN) access access. In the downlink NAS message, the IE is included to indicate the forbidden TAI(s) to be stored in the list of "forbidden tracking areas for regional provision of service". The IE is included only if the message is sent via satellite E-UTRAN access. In the E-UTRAN (S1 mode) the IE can be included in the Attach reject, attach accept, detach request Tracking area update accept, tracking area update reject, Service accept, Service reject NAS message.

In N1 mode over 3GPP access, the UE update the suitable list of "5GS forbidden tracking areas for roaming", or "5GS forbidden tracking areas for regional provision of service" whenever a REGISTRATION REJECT, a SERVICE REJECT or a DEREGISTRATION REQUEST is received with 5GMM cause 12 "tracking area not allowed", #13 "roaming not allowed in the tracking area", or #15 "no suitable cells in the tracking area". In case, the UE is on the 5GS over the 3GPP access and not operating in a SNPN access mode, tracking area(s) is removed from the list of "5GS forbidden tracking areas for roaming", as well as the list of "5GS forbidden tracking areas for regional provision of service", if the UE receives the tracking area in the TAI list or the Service area list of "allowed tracking areas" in a REGISTRATION ACCEPT message or a CONFIGURATION UPDATE COMMAND message. In the non-access stratum (NAS) message an Information Element (IE) is included to indicate the forbidden TAI(s) to be stored in the list of "Fifth Generation (5GS) forbidden tracking areas for roaming". The IE is included only if the message is sent via satellite Next Generation-Radio Access Network (NG-RAN) access. In the non-access stratum (NAS) message, the IE is included to indicate the forbidden TAI(s) to be stored in the list of "5GS forbidden tracking areas for regional provision of service". The IE is included only if the message is sent via satellite NG-RAN access. In the NI mode, the IE can be included in the Registration reject, Registration accept, De-registration request, Service accept, Service reject NAS message FIG. 1A is a sequence diagram illustrating a method for providing list of forbidden TAIs linked to different PLMN ID when UE is in 5GS (i.e NI mode). Consider the TAI-1 tracking area identity belongs to a PLMN id PLMN-1 and the TAI-2 tracking area identity belongs to a PLMN id PLMN-2. At step 1, the UE (100) sends a Registration Request to the first PLMN (i.e., PLMN-1). At step 2, an Access and Mobility Management Function (AMF) of the PLMN-1 sends the Registration Accept by including TAI#2 in Forbidden TAI(s) for the list of "5GS forbidden tracking areas for roaming" or Forbidden TAI(s) for the list of "5GS forbidden tracking areas for regional provision of service". At step 3, the UE (100) stores TAI#2 as TAI#2 is in the list of "5GS forbidden tracking areas for roaming", or in the list of "5GS forbidden tracking areas for regional provision of service" based on the IE where the AMF included the TAI#2. At step 4, the UE (100) does not go to TAI#2 even though it belongs to the PLMN 2. However, the conventional system and method cause security issues and unnecessary access blocking for the UE (100).

FIG. 1B is a sequence diagram illustrating a method for providing list of forbidden TAIs linked to different PLMN ID when UE in E-UTRAN (i.e S1 mode). Consider the TAI-1 tracking area identity belongs to a PLMN id PLMN-1 and the TAI-2 tracking area identity belongs to a PLMN id PLMN-2. At step 1, the UE (100) sends a Tracking are update Request to the first PLMN (i.e., PLMN-1) (200*a*). At step 2, an Access and Mobility Management Entity (or the MME) of the PLMN-1 (200*a*) sends the Tracking Area Update Accept by including TAI#2 in Forbidden TAI(s) for the list of "forbidden tracking areas for roaming" or Forbidden TAI(s) for the list of "forbidden tracking areas for regional provision of service". At step 3, the UE (100) stores TAI#2 as TAI#2 is in the list of "forbidden tracking areas for roaming", or in the list of "forbidden tracking areas for regional provision of service". At step 4, the UE (100) does not go to TAI#2 even though it belongs to the PLMN 2 (200*b*). However, the conventional system and method cause security issues and unnecessary access blocking for the UE (100).

The very same issue will happen if AMF include TAI#2 in Forbidden TAI(s) for the list of "5GS forbidden tracking areas for roaming" and/or Forbidden TAI(s) for the list of "5GS forbidden tracking areas for regional provision of service" in any NAS message (e.g., Registration reject, De-registration request, Service accept, Service reject NAS message etc) or the MME include TAI#2 in Forbidden TAI(s) for the list of "forbidden tracking areas for roaming" and/or Forbidden TAI(s) for the list of "forbidden tracking areas for regional provision of service" in any NAS message (e. ATTACH REJECT, ATTACH ACCEPT, DETACH REQUEST, TRACKING AREA UPDATE REJECT, SERVICE ACCEPT, SERVICE REJECT NAS message etc)

The above mentioned case is serious issue as a PLMN-1 operator acting maliciously can block the UE (100) to move to a PLMN-2 (to increase its revenue) though for the home operator, but the PLMN-2 is preferred at the UE location. The UE (100) will remain on the PLMN-1 increase revenue of the PLMN-1 impacting HPLMN revenue and UEs services. Further, this may also cause service disruption if the UE (100) moves away from TAI0 (PLMN-1) and there is no other TAI from the PLMN-1, the UE (100) will end up in a NO service/Limited service, even though the PLMN-2 is available in that area. It is desired to address the above mentioned disadvantages or other short comings or at least provide a useful alternative.

Embodiments disclosed herein provide method for handling forbidden TAI belongs to different PLMN-ID in a network (1000) by UE (100). The method includes receiving an IE from a first PLMN (200*a*) in the network (1000). The IE includes at least one of a Forbidden TAI(s) for list of "5GS forbidden tracking areas for roaming" and Forbidden TAI(s) for a list of "5GS forbidden tracking areas for a regional provision of service". Further, the method includes determining whether the TAI in IE belongs to the first PLMN or second PLMN in the network. In an embodiment, the method includes storing TAI in the forbidden TAI list in a memory of the UE (100) when the TAI in the IE belongs to the first PLMN (200*a*). In another embodiment, the method includes ignoring the TAI in memory when the forbidden TAI in the IE belongs to the second PLMN.

Accordingly, the embodiments herein provide a method for handling TAI belongs to different PLMN-ID in a telecommunication network. The method includes receiving, by a UE in the telecommunication network, an IE from a first PLMN in the telecommunication network. The IE includes at least one forbidden TAI for "forbidden tracking areas for one of 'roaming' and 'regional provision of service' in the telecommunication network. Further, the method includes determining, by the UE, whether the at least one forbidden TAI belongs to the first PLMN or at least one second PLMN in the telecommunication network. In an embodiment, the method includes storing the at least one forbidden TAI in a memory of the UE when the at least one forbidden TAI belongs to the first PLMN. In another embodiment, the method includes skipping storing of the at least one forbidden TAI in the memory of the UE when the at least one forbidden TAI belongs to the at least one second PLMN.

In an embodiment, in a NI mode over a 3GPP access, when the UE receives a "5GS forbidden tracking areas for roaming" IE or a "5GS forbidden tracking areas for regional provision of service" IE in the REGISTRATION REJECT, SERVICE REJECT, DEREGISTRATION REQUEST, REGISTRATION ACCEPT or SERVICE ACCEPT message, the UE updates the suitable list with the received TAI(s) belonging to the serving PLMN or equivalent PLMN(s) and ignores the TAI(s) which do not belong to the serving PLMN or equivalent PLMN(s) included in the IE.

In an embodiment, when the UE receives the forbidden TAI(s) for the list of "5GS forbidden tracking areas for roaming" IE in the REGISTRATION REJECT message, the UE shall store the TAI(s) belonging to the serving PLMN or the equivalent PLMN(s) and ignore the TAI(s) which do not belong to the serving PLMN or the equivalent PLMN(s) included in the IE, if not already stored, into the list of "5GS forbidden tracking areas for roaming".

In an embodiment, if the UE receives the forbidden TAI(s) for the list of "5GS forbidden tracking areas for regional provision of service" IE in the REGISTRATION REJECT message, the UE shall store the TAI(s) belonging to the serving PLMN or the equivalent PLMN(s) and ignores the TAI(s) which do not belong to the serving PLMN or the equivalent PLMN(s) included in the IE, if not already stored, into the list of "5GS forbidden tracking areas for regional provision of service".

In an embodiment, if the UE receives the forbidden TAI(s) for the list of "5GS forbidden tracking areas for roaming" IE in the REGISTRATION ACCEPT message and the TAI(s) included in the IE is not part of the list of "5GS forbidden tracking areas for roaming", the UE shall store the TAI(s) belonging to the serving PLMN or the equivalent PLMN(s) and ignores the TAI(s) which do not belong to the serving PLMN or the equivalent PLMN(s) included in the IE into the list of "5GS forbidden tracking areas for roaming" and removes the TAI(s) from the stored TAI list if present.

In an embodiment, if the UE receives the Forbidden TAI(s) for the list of "5GS forbidden tracking areas for regional provision of service" IE in the REGISTRATION ACCEPT message and the TAI(s) included in the IE is not part of the list of “5GS forbidden tracking areas for regional provision of service”, the UE shall store the TAI(s) belonging to the serving PLMN or equivalent PLMN(s) and ignores the TAI(s) which do not belong to the serving PLMN or the equivalent PLMN(s) included in the IE into the list of “5GS forbidden tracking areas for regional provision of service” and removes the TAI(s) from the stored TAI list if present.

In an embodiment, if the UE receives the Forbidden TAI(s) for the list of “5GS forbidden tracking areas for roaming” IE in the DEREGISTRATION REQUEST message, the UE shall store the TAI(s) belonging to the serving PLMN or the equivalent PLMN(s) and ignore the TAI(s) which do not belong to the serving PLMN or equivalent PLMN(s) included in the IE, if not already stored, into the list of “5GS forbidden tracking areas for roaming”.

In an embodiment, if the UE receives the Forbidden TAI(s) for the list of “5GS forbidden tracking areas for regional provision of service” IE in the DEREGISTRATION REQUEST message, the UE shall store the TAI(s) belonging to the serving PLMN or equivalent PLMN(s) and ignore the TAI(s) which do not belong to the serving PLMN or equivalent PLMN(s) included in the IE, if not already stored, into the list of “5GS forbidden tracking areas for regional provision of service”.

In an embodiment, if the UE receives the Forbidden TAI(s) for the list of “5GS forbidden tracking areas for roaming” IE in the SERVICE ACCEPT message and the TAI(s) included in the IE is not part of the list of “5GS forbidden tracking areas for roaming”, the UE shall store the TAI(s) belonging to the serving PLMN or equivalent PLMN(s) and ignore the TAI(s) which do not belong to the serving PLMN or equivalent PLMN(s) included in the IE into the list of “5GS forbidden tracking areas for roaming” and remove the TAI(s) from the stored TAI list if present.

In an embodiment, if the UE receives the Forbidden TAI(s) for the list of “5GS forbidden tracking areas for regional provision of service” IE in the SERVICE ACCEPT message and the TAI(s) included in the IE is not part of the list of “5GS forbidden tracking areas for regional provision of service”, the UE shall store the TAI(s) belonging to the serving PLMN or equivalent PLMN(s) and ignore the TAI(s) which do not belong to the serving PLMN or equivalent PLMN(s) included in the IE into the list of “5GS forbidden tracking areas for regional provision of service” and remove the TAI(s) from the stored TAI list if present.

In an embodiment, based on the proposed method, the UE ignores/discards and does not add the TAIs, Closed Access Group (CAG), cell ID, geographical location that are not belonging to at least one of the serving PLMN or the equivalent PLMN or the equivalent Home Public Land Mobile Network Identifier (HPLMN), or to add the TAIs, the CAG, the cell ID, and the geographical location which are belonging to at least one of the serving PLMN (i.e. registered PLMN) or the equivalent PLMN or the equivalent HPLMN to the respective forbidden TAI list e.g. “5GS forbidden tracking areas for roaming” or Forbidden TAI(s) for the list of “5GS forbidden tracking areas for regional provision of service”, when the UE receives the NAS message like registration accept or CONFIGURATION UPDATE COMMAND including forbidden TAI list e.g. “5GS forbidden tracking areas for roaming” or Forbidden TAI(s) for the list of “5GS forbidden tracking areas for regional provision of service” or forbidden PLMN list or any other forbidden area list for example CAG, cell Identifier (ID) and geographical location.

In an embodiment, in a S1 mode over a 3GPP access (or E-UTRAN), when the UE receives a “forbidden tracking areas for roaming” IE or a “forbidden tracking areas for regional provision of service” IE in the ATTACH REJECT, ATTACH ACCEPT, DETACH REQUEST, TRACKING AREA UPDATE REJECT, TRACKING AREA UPDATE REQUEST, SERVICE ACCEPT, SERVICE REJECT NAS message, the UE updates the suitable list with the received TAI(s) belonging to the serving PLMN or equivalent PLMN (s) and ignores the TAI(s) which do not belong to the serving PLMN or equivalent PLMN(s) included in the IE.

In an embodiment, If the UE receives the Forbidden TAI(s) for the list of “forbidden tracking areas for roaming” IE in the TRACKING ARE UPDATE ACCEPT message and the TAI(s) included in the IE is not part of the list of “forbidden tracking areas for roaming”, the UE shall store the TAI(s) belonging to the serving PLMN or the equivalent PLMN(s) and ignore the TAI(s) which do not belong to the serving PLMN or the equivalent PLMN(s) included in the IE into the list of “forbidden tracking areas for roaming” and remove the TAI(s) from the stored TAI list if present In an embodiment, If the UE receives the Forbidden TAI(s) for the list of “forbidden tracking areas for regional provision of service” IE in the TRACKING AREA UPDATE ACCEPT message and the TAI(s) included in the IE is not part of the list of “forbidden tracking areas for regional provision of service”, the UE shall store the TAI(s) belonging to the serving PLMN or the equivalent PLMN(s) and ignore the TAI(s) which do not belong to the serving PLMN or the equivalent PLMN(s) included in the IE into the list of “forbidden tracking areas for regional provision of service” and remove the TAI(s) from the stored TAI list if present In an embodiment, if the UE receives the forbidden TAI(s) for the list of “forbidden tracking areas for roaming” IE in the NAS message (e.g., ATTACH REJECT, ATTACH ACCEPT, DETACH REQUEST, TRACKING AREA UPDATE REJECT, SERVICE ACCEPT, SERVICE REJECT), the UE shall store the TAI(s) belonging to the serving PLMN or the equivalent PLMN(s) and ignore the TAI(s) which do not belong to the serving PLMN or the equivalent PLMN(s) included in the IE, if not already stored, into the list of “forbidden tracking areas for roaming”.

In an embodiment, if the UE receives the forbidden TAI(s) for the list of “forbidden tracking areas for regional provision of service” IE in the NAS message (e.g., ATTACH REJECT, ATTACH ACCEPT, DETACH REQUEST, TRACKING AREA UPDATE REJECT, SERVICE ACCEPT, SERVICE REJECT), the UE shall store the TAI(s) belonging to the serving PLMN or the equivalent PLMN(s) and ignore the TAI(s) which do not belong to the serving PLMN or the equivalent PLMN(s) included in the IE, if not already stored, into the list of “forbidden tracking areas for regional provision of service”.

Referring now to the drawings, and more particularly to FIGS. 2 through 7, there are shown preferred embodiments.

FIG. 2 shows various hardware components of a telecommunication network (1000) for handling forbidden TAI belongs to different PLMN-IDs, according to the embodiments as disclosed herein. In an embodiment, the telecommunication network (1000) includes a UE (100), a first PLMN (200*a*) and a second PLMN (200*b*). The UE (100) can be, for example, but not limited to a laptop, a smart phone, a desktop computer, a notebook, a Device-to-Device (D2D) device, a vehicle to everything (V2X) device, a foldable phone, a smart TV, a tablet, an immersive device, and an internet of things (IoT) device. The telecommunication network (1000) can be, for example, but not limited to a fourth generation (4G) network, a fifth generation (5G) network, an Open Radio Access Network (ORAN) or the like.

In an embodiment, the UE (100) includes a processor (110), a communicator (120), a memory (130) and a forbidden TAI controller (140). The processor (110) is coupled with the communicator (120), the memory (130) and the forbidden TAI controller (140).

The forbidden TAI controller (140) receives an IE from the first PLMN (200*a*) in the telecommunication network (1000). The IE includes a Forbidden TAI(s) for a list of "5GS forbidden tracking areas for roaming" and a Forbidden TAI(s) for a list of "5GS forbidden tracking areas for a regional provision of service". The UE (100) is in a N1 mode over a 3GPP access. In an embodiment, the forbidden TAI controller (140) sends a first message to the first PLMN (200*a*). The first message is one of a REGISTRATION REQUEST message or a SERVICE REQUEST message. The first PLMN (200*a*) can be a serving PLMN. Further, the forbidden TAI controller (140*b*) receives a second message from the first PLMN (200*a*) based on the first message or independently. The second message is one of a REGISTRATION REJECT message, a SERVICE REJECT message, a DEREGISTRATION REQUEST message, a REGISTRATION ACCEPT message, and a SERVICE ACCEPT message.

Further, the forbidden TAI controller (140) determines whether the TAI in the IE belongs to the first PLMN (200*a*) or the second PLMN (200*b*). In an embodiment, the forbidden TAI controller (140) stores the TAI in the forbidden TAI list in the memory (130) of the UE (100) when the TAI in the IE belongs to the first PLMN (200*a*). In an embodiment, the forbidden TAI controller (140) stores the TAI belonging to serving PLMN and its equivalent in the Forbidden TAI(s) for the list of "5G forbidden tracking areas for roaming" IE into the list of "5GS forbidden tracking areas for roaming". In another embodiment, the forbidden TAI controller (140) stores TAI belonging to serving PLMN and its equivalent in Forbidden TAI(s) for the list of "5GS forbidden tracking areas for regional provision of service" IE into the list of "5GS forbidden tracking areas for regional provision of service" in the UE (100). In another embodiment, the forbidden TAI controller (140) ignores (or skips storing) the TAI in the memory (130) of the UE (100) when the TAI in the IE belongs to the second PLMN (200*b*).

In another embodiment, the forbidden TAI controller (140) receives the IE included in the NAS message. The NAS message can be, for example, but not limited to an ATTACH REJECT message, an ATTACH ACCEPT message, a DETACH REQUEST message, a TRACKING AREA UPDATE REJECT message, a TRACKING AREA UPDATE ACCEPT message, a SERVICE ACCEPT message, and a SERVICE REJECT message. The IE comprises at least one of a forbidden TAI(s) for a list of "forbidden tracking areas for roaming" and a forbidden TAI(s) for a list of a "forbidden tracking areas for regional provision of service", wherein the UE is in a S1 mode over a 3GPP access (or E-UTRAN). Further, the forbidden TAI controller (140) stores a list in the UE (100) with the at least one TAI belonging to the serving PLMN or the equivalent PLMN included in the IE. In an embodiment, the forbidden TAI controller (140) stores TAI belonging to serving PLMN and its equivalent in the Forbidden TAI(s) for the list of "forbidden tracking areas for roaming" IE into the list of "forbidden tracking areas for roaming". In another embodiment, the forbidden TAI controller (140) stores TAI belonging to serving PLMN and its equivalent in Forbidden TAI(s) for the list of "forbidden tracking areas for regional provision of service "IE into the list of" forbidden tracking areas for regional provision of service". Further, the forbidden TAI controller (140) ignores the TAI which do not belong to the serving PLMN or the equivalent PLMN included in the IE.

The forbidden TAI controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (110) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (110) may include multiple cores and is configured to execute the instructions stored in the memory (130).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the telecommunication network (1000) but it is to be understood that other embodiments are not limited thereon. In other embodiments, the telecommunication network (1000) may include less or more number of components. Further, the labels or names of the components are used only for illustrative purpose and does not limit the scope of the invention. One or more components can be combined together to perform same or substantially similar function in the telecommunication network (1000).

FIG. 3A is a flow chart (S300*a*) illustrating a method for handling the forbidden TAI belongs to the different PLMN-IDs in the telecommunication network (1000), according to the embodiments as disclosed herein. The operations (S302*a*-S308*b*) are handled by the forbidden TAI controller (140).

At S302*a*, the method includes receiving the IE from the first PLMN (200*a*) in the telecommunication network (1000). The IE includes the of the Forbidden TAI(s) for the list of "5GS forbidden tracking areas for roaming" and the Forbidden TAI(s) for the list of "5GS forbidden tracking areas for a regional provision of service". The UE (100) is in the N1 mode over the 3GPP access. At S304*a*, the method includes determining whether the TAI in the IE belongs to the first PLMN (200*a*) or the second PLMN (200*b*) in the telecommunication network (1000). In an embodiment, at S306*a*, the method includes storing TAI in the forbidden TAI list in the memory (130) of the UE (100) when the TAI in the IE belongs to the first PLMN (200*a*). In another embodiment, at S308*a*, the method includes skipping storing of the TAI in the memory (130) of the UE (100) when the TAI in the IE belongs to the second PLMN (200*b*).

is a flow chart (300*b*) illustrating a method for handling forbidden TAI belongs to the different PLMN-IDs in the telecommunication network (1000), according to the embodiments as disclosed herein. The operations (S302*b*-S306*b*) are handled by the forbidden TAI controller (140).

At S302*b*, the method includes receiving the IE included in the NAS message. The IE includes one of the "forbidden tracking areas for roaming" and/or the "forbidden tracking areas for regional provision of service". The UE (100) is in the S1 mode over the 3GPP access. At S304*b*, the method includes store the respective list in the UE with the TAI belonging to the serving PLMN or the equivalent PLMN included in the IE if not already stored. At S306*b*, the method includes ignoring the TAI which do not belong to the serving PLMN or the equivalent PLMN included in the IE.

FIG. 4 is a sequence diagram illustrating a method, by the UE (100), for not adding the TAIs in the forbidden TAIs linked to the different PLMN IDs in N1 mode, according to the embodiments as disclosed herein.

At step 1, the UE (100) sends the registration request to the first PLMN (200*a*). At step 2, the AMF (i.e., first PLMN (200*a*)) sends the registration accept (or registration reject message or any other NAS message (Refer to 24.501 for list of NAS message) by including TAI#2 in Forbidden TAI(s) for the list of "5GS forbidden tracking areas for roaming" or Forbidden TAI(s) for the list of "5GS forbidden tracking areas for regional provision of service". At step 3, the UE (100) shall not store (i.e. ignore/discard) TAI#2 even though TAI#2 is in the list of "5GS forbidden tracking areas for roaming", or in the list of "5GS forbidden tracking areas for regional provision of service" as TAI#2 belongs to different PLMN ID which is not equivalent. At step 4, the UE (100) may go to TAI#2 based on current prior art conditions even though it belongs to PLMN 2.

FIG. 5 is a sequence diagram illustrating a method, by the UE (100), for not adding TAIs in the forbidden TAIs linked to the different PLMN ID in N1 mode, according to the embodiments as disclosed herein.

At step 1, the UE (100) sends the registration request to the first PLMN (200*a*). At step 2, the AMF shall not include TAI#2 as it belongs to different PLMN which is not equivalent while sending the registration accept (or registration reject message or any other NAS message (please refer to 24.501 for list of NAS message) including Forbidden TAI(s) for the list of "5GS forbidden tracking areas for roaming" or Forbidden TAI(s) for the list of "5GS forbidden tracking areas for regional provision of service". In other words, the telecommunication network (1000) can only include tracking area identity belongs to the same serving PLMN (PLMN on which the UE (100) is attempting to register, also can be called as registered PLMN) (and/or optionally Equivalent PLMN ID or optionally equivalent HPLMN) in the forbidden lists e.g. "5GS forbidden tracking areas for roaming" or Forbidden TAI(s) for the list of "5GS forbidden tracking areas for regional provision of service" or forbidden PLMN list or any other forbidden area list for e.g. CAG, cell ID, geographical location and provide it as part of NAS message (please refer to TS 24.501 for the list of all the NAS messages) to the UE (100).

FIG. 6 is a sequence diagram illustrating a method, by the UE (100), for not adding the TAIs in the forbidden TAIs linked to the different PLMN IDs in S1 mode, according to the embodiments as disclosed herein.

At step 1, the UE (100) sends the Tracking area update request to the first PLMN (200*a*). At step 2, the MME (i.e., first PLMN (200*a*)) sends the Tracking Area Update accept (or Tracking Area Update Reject message or any other NAS message (Refer to 24.301 for list of NAS message) by including TAI#2 in Forbidden TAI(s) for the list of "forbidden tracking areas for roaming" or Forbidden TAI(s) for the list of "forbidden tracking areas for regional provision of service". At step 3, the UE (100) shall not store (i.e. ignore/discard) TAI#2 even though TAI#2 is in the list of "forbidden tracking areas for roaming", or in the list of "forbidden tracking areas for regional provision of service" as TAI#2 belongs to different PLMN ID which is not equivalent. At step 4, the UE (100) may go to TAI#2 based on current prior art conditions even though it belongs to PLMN 2.

FIG. 7 is a sequence diagram illustrating a method, by the UE (100), for not adding TAIs in the forbidden TAIs linked to the different PLMN ID, according to the embodiments as disclosed herein.

At step 1, the UE (100) sends the Tracking Area Update request to the first PLMN (200*a*). At step 2, the MME shall not include TAI#2 as it belongs to different PLMN which is not equivalent while sending the Tracking Area Update Accept (or Tracking Area Update Reject message or any other downlink NAS message (please refer to 24.301 for list of NAS message) including Forbidden TAI(s) for the list of "forbidden tracking areas for roaming" or Forbidden TAI(s) for the list of "forbidden tracking areas for regional provision of service". In other words, the telecommunication network (1000) can only include tracking area identity belongs to the same serving PLMN (PLMN on which the UE (100) is attempting to register, also can be called as registered PLMN) (and/or optionally Equivalent PLMN ID or optionally equivalent HPLMN) in the forbidden lists e.g. "forbidden tracking areas for roaming" or Forbidden TAI(s) for the list of "forbidden tracking areas for regional provision of service" or forbidden PLMN list or any other forbidden area list for e.g. CAG, cell ID, geographical location and provide it as part of NAS message (please refer to TS 24.301 for the list of all the NAS messages) to the UE (100).

The various actions, acts, blocks, steps, or the like in the flow charts (S300*a* and S300*b*) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a terminal in a wireless communication system, the method comprising:

receiving, from an access and mobility management function (AMF), a message comprising information on forbidden tracking areas; identifying whether at least one tracking area identity (TAI) in the information belongs to a serving public land mobile network (PLMN) or an equivalent PLMN;

in case that the at least one TAI in the information belongs to the serving PLMN or the equivalent PLMN, storing the at least one TAI; and in case that the at least one TAI in the information does not belong to the serving PLMN or the equivalent PLMN, ignoring the at least one TAI.

2. The method of claim 1, wherein the information is at least one of information on forbidden tracking areas for roaming or information on forbidden tracking areas for regional provision of service.

3. The method of claim 1, wherein the message is one of a message for registration acceptance, a message for registration rejection, a message for service acceptance, a message for service rejection, or a message for deregistration request.

4. The method of claim 1, wherein the storing comprises storing the at least one TAI into a list of the forbidden tracking areas.

5. The method of claim 1, wherein the storing comprises storing at least one of information on a closed access group (CAG), information on a cell ID, or information on a geographical location associated with the serving PLMN or the equivalent PLMN.

6. A terminal in a wireless communication system, the terminal comprising:

a transceiver; and at least one processor coupled with the transceiver and configured to:

receive, from an access and mobility management function (AMF), a message comprising information on forbidden tracking areas, identify whether at least one tracking area identity (TAI) in the information belongs to a serving public land mobile network (PLMN) or an equivalent PLMN, in case that the at least one TAI in the information belongs to the serving PLMN or the equivalent PLMN, store the at least one TAI, and in case that the at least one TAI in the information does not belong to the serving PLMN or the equivalent PLMN, ignore the at least one TAI.

7. The terminal of claim 6, wherein the information is at least one of information on forbidden tracking areas for roaming or information on forbidden tracking areas for regional provision of service.

8. The terminal of claim 6, wherein the message is one of a message for registration acceptance, a message for registration rejection, a message for service acceptance, a message for service rejection, or a message for deregistration request.

9. The terminal of claim 6, wherein the at least one processor is further configured to:

store the at least one TAI into a list of the forbidden tracking areas.

10. The terminal of claim 6, wherein the at least one processor is further configured to:

store at least one of information on a closed access group (CAG), information on a cell ID, or information on a geographical location associated with the serving PLMN or the equivalent PLMN.

* * * * *